(12) United States Patent
Finnouche et al.

(10) Patent No.: US 12,391,591 B2
(45) Date of Patent: *Aug. 19, 2025

(54) PROCESS COOLING WATER SYSTEM CONTROL SYSTEMS AND METHODS FOR IRON AND STEELMAKING APPLICATIONS

(71) Applicant: CHEMTREAT, INC., Glen Allen, VA (US)

(72) Inventors: Faycal Finnouche, Algiers (AG); David Oswald, Hartwell, GA (US)

(73) Assignee: CHEMTREAT, INC., Glen Allen, VA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/001,720

(22) Filed: Aug. 25, 2020

(65) Prior Publication Data

US 2022/0064037 A1 Mar. 3, 2022

(51) Int. Cl.
*C02F 5/08* (2023.01)
*C02F 1/00* (2023.01)
(Continued)

(52) U.S. Cl.
CPC .............. *C02F 5/08* (2013.01); *C02F 1/008* (2013.01); *C02F 2001/007* (2013.01);
(Continued)

(58) Field of Classification Search
CPC .. C02F 1/008; C02F 1/00; C02F 1/469; C02F 1/46; C02F 5/08; C02F 5/10; C02F 5/12; C02F 5/14; C02F 2001/007; C02F 2103/023; C02F 2103/16; C02F 2103/10; C02F 2209/005; C02F 2209/02; C02F 2209/055; C02F 2209/06; C02F 2209/07;
(Continued)

(56) References Cited

U.S. PATENT DOCUMENTS

| | | | | |
|---|---|---|---|---|
| 3,361,150 A | * | 1/1968 | Horner | F22B 21/06 324/438 |
| 3,718,556 A | * | 2/1973 | Rohrback | C02F 1/4602 205/743 |

(Continued)

FOREIGN PATENT DOCUMENTS

EP 2792647 A1 10/2014

OTHER PUBLICATIONS

Nov. 2, 2020 International Search Report issued on PCT Application No. PCT/US2020/047877.

(Continued)

*Primary Examiner* — Akash K Varma
(74) *Attorney, Agent, or Firm* — Oliff PLC

(57) ABSTRACT

A process cooling water (PCW) system and method for an iron or steelmaking application, the PCW system and method including: sampling a plurality of characteristics of PCW using a plurality of sensors; calculating one or more of Langelier Saturation Index (LSI) and Ryznar Stability Index (RSI) based on the plurality of characteristics using a LSI/RSI measurement unit coupled to the plurality of sensors; and injecting one or more anti-scalant chemicals into the PCW responsive to the calculated one or more of the LSI and the RSI in real time using an anti-scalant injection system to thereby control scale formation in the PCW.

22 Claims, 5 Drawing Sheets

(51) Int. Cl.
*C02F 103/02* (2006.01)
*C02F 103/16* (2006.01)

(52) U.S. Cl.
CPC .... *C02F 2103/023* (2013.01); *C02F 2103/16* (2013.01); *C02F 2209/005* (2013.01); *C02F 2209/02* (2013.01); *C02F 2209/055* (2013.01); *C02F 2209/06* (2013.01); *C02F 2209/07* (2013.01); *C02F 2209/10* (2013.01)

(58) Field of Classification Search
CPC .............. C02F 2209/10; C02F 2209/00; C02F 2209/05; B01D 61/48; B21B 37/74; B21B 45/02; C22C 33/04; F25D 17/02; F27D 9/00
USPC ........................................................ 210/696
See application file for complete search history.

(56) References Cited

U.S. PATENT DOCUMENTS

| | | | |
|---|---|---|---|
| 4,464,315 A | 8/1984 | O'Leary | |
| 4,814,406 A * | 3/1989 | Katayama | C02F 5/10 526/318.4 |
| 6,514,417 B2 | 2/2003 | Purta et al. | |
| 8,524,088 B2 | 9/2013 | Arbogast et al. | |
| 9,586,842 B2 | 3/2017 | Gifford et al. | |
| 2003/0052303 A1 | 3/2003 | Buentello et al. | |
| 2003/0127391 A1 | 7/2003 | Craft et al. | |
| 2010/0051559 A1 | 3/2010 | Musale | |
| 2012/0091069 A1* | 4/2012 | Fischmann | C02F 9/00 210/758 |
| 2012/0297928 A1 | 11/2012 | Lang et al. | |
| 2013/0026105 A1* | 1/2013 | Duarte | F28F 25/00 210/696 |
| 2013/0256135 A1 | 10/2013 | Jha et al. | |
| 2014/0197102 A1 | 7/2014 | Van Der Wal et al. | |
| 2016/0115046 A1* | 4/2016 | Gifford | B01D 61/48 204/632 |
| 2016/0229726 A1 | 8/2016 | Felipe et al. | |
| 2018/0018665 A1 | 1/2018 | Chene et al. | |
| 2018/0186656 A1 | 7/2018 | Drewniak et al. | |
| 2020/0239344 A1 | 7/2020 | Rodrigues | |
| 2021/0331942 A1 | 10/2021 | Boudreaux et al. | |

OTHER PUBLICATIONS

Dec. 15, 2021 International Search Report issued in International Application No. PCT/US21/48843.

Dec. 15, 2021 Written Opinion of the International Searching Authority issued in International Application No. PCT/US21/48843.

U.S. Appl. No. 17/465,180, filed Sep. 2, 2021 in the name of Boudreaux et al.

Nov. 18, 2020 International Search Report issued in International Application No. PCT/US2020/047877.

Nov. 18, 2020 Written Opinion of the International Searching Authority issued in International Application No. PCT/US2020/047877.

Mar. 15, 2024 Extended European Search Report issued in Application No. 20951772.1.

Apr. 1, 2025 Notice of Allowance issued in U.S. Appl. No. 17/465,180.

* cited by examiner

PROCESS COOLING WATER SYSTEM CONTROL SYSTEMS AND METHODS FOR IRON AND STEELMAKING APPLICATIONS

TECHNICAL FIELD

The present disclosure relates generally to the iron and steelmaking fields. More particularly, the present disclosure relates to process cooling water (PCW) control systems and methods for iron and steelmaking applications, including direct reduction (DR) applications.

BACKGROUND

Proper cooling water management is essential for preventing corrosion and minimizing scale in iron and steelmaking applications. While the presence of scale will prevent corrosion, too much scale will impair the operation of the PCW system. Accurate measurement of the parameters that indicate cooling water scaling potential is necessary for attaining a proper balance between corroding and scaling environments.

Langelier Saturation Index (LSI) and Ryznar Stability Index (RSI) are chemical equilibrium models derived from the theoretical concept of saturation and provide indicators of the degree of saturation of water with respect to calcium carbonate. LSI was formulated in the 1930's, and RSI was formulated in the 1940's as a more refined indication of scaling and corrosion potential in a water system. Both indices are widely recognized and used metrics in the industry of process water control and treatment.

Determination of LSI and RSI is generally carried out in the laboratory using water samples that have been secured from a process. The formulation for these indices requires that the following variables are measured, concurrently and accurately:
(1) pH;
(2) Total Dissolved Solids (TDS), defined as 0.7*Conductance in µS/cm;
(3) Temperature;
(4) Calcium Hardness as $Ca^{+2}$; and
(5) Alkalinity.

Over the years, development of on-line equipment for the determination of items (2)-(5) above has occurred, but on-line pH determination has not been successful in dirty process water systems in iron and steelmaking processes because the contaminates have fouled existing pH monitors. Due to this limitation, real-time LSI/RSI determinations in the following systems have not been possible:
(1) Direct Reduced Iron (DRI) PCW systems;
(2) Blast Furnace Process Water Systems; and
(3) Basic Oxygen Furnace (BOF)/Quick Basic Oxygen Process (QBOP)/Basic Oxygen Steelmaking (BOS) Processes.

However, work at a DRI plant has demonstrated that a pH sensor used in a PCW clarifier may provide a "trouble-free" sensor capable of providing the "missing" variable to accurately calculate in real time LSI and RSI for process water (see FIG. 1).

Thus, the present disclosure provides a pH sensor that eliminates the need for continuous cleaning and re-standardization, providing comprehensive equipment, a programmable logic controller (PLC), and an algorithm package that enables continuous, reliable, and accurate LSI/RSI monitoring for PCW systems in DRI, Blast Furnace, and steelmaking systems.

SUMMARY

In one illustrative embodiment, the present disclosure provides a process cooling water (PCW) system for an iron or steelmaking application, the PCW system including: a plurality of sensors operable for sampling a plurality of characteristics of PCW; a Langelier Saturation Index (LSI)/Ryznar Stability Index (RSI) measurement unit coupled to the plurality of sensors and operable for calculating one or more of LSI and RSI based on the plurality of characteristics; and an anti-scalant injection system operable for injecting one or more anti-scalant chemicals into the PCW responsive to the calculated one or more of the LSI and the RSI to thereby control scale formation in the PCW. The plurality of sensors include one or more of: a pH sensor operable for measuring a pH characteristic of the PCW; a total dissolved solids (TDS) sensor operable for measuring a TDS characteristic of the PCW; a temperature sensor operable for measuring a temperature characteristic of the PCW; a calcium hardness sensor operable for measuring a calcium hardness characteristic of the PCW; and an alkalinity (TAC) sensor operable for measuring an alkalinity characteristic of the PCW. The anti-scalant injection system includes a distributed control system (DCS) in communication with the LSI/RSI measurement unit and an anti-scalant chemical dosing pump. Optionally, the plurality of sensors are disposed within a clarifier of the PCW system. Optionally, the plurality of sensors are disposed within a cold well of the clarifier of the PCW system. Alternatively, the plurality of sensors are in-line downstream of a heat exchanger of the PCW system. Optionally, the anti-scalant injection system is fluidly coupled to a cold well of a clarifier of the PCW system.

In another illustrative embodiment, the present disclosure provides a process cooling water (PCW) method for an iron or steelmaking application, the PCW method including: sampling a plurality of characteristics of PCW using a plurality of sensors; calculating one or more of Langelier Saturation Index (LSI) and Ryznar Stability Index (RSI) based on the plurality of characteristics using a LSI/RSI measurement unit coupled to the plurality of sensors; and injecting one or more anti-scalant chemicals into the PCW responsive to the calculated one or more of the LSI and the RSI using an anti-scalant injection system to thereby control scale formation in the PCW. The plurality of sensors include one or more of: a pH sensor operable for measuring a pH characteristic of the PCW; a total dissolved solids (TDS) sensor operable for measuring a TDS characteristic of the PCW; a temperature sensor operable for measuring a temperature characteristic of the PCW; a calcium hardness sensor operable for measuring a calcium hardness characteristic of the PCW; and an alkalinity (TAC) sensor operable for measuring an alkalinity characteristic of the PCW. The anti-scalant injection system includes a distributed control system (DCS) in communication with the LSI/RSI measurement unit and an anti-scalant chemical dosing pump. Optionally, the plurality of sensors are disposed within a clarifier of the PCW system. Optionally, the plurality of sensors are disposed within a cold well of the clarifier of the PCW system. Alternatively, the plurality of sensors are in-line downstream of a heat exchanger of the PCW system. Optionally, the anti-scalant injection system is fluidly coupled to a cold well of a clarifier of the PCW system. Further, the present disclosure provides a non-transitory computer-readable medium stored in a memory and executed by a processor to execute process cooling water (PCW) method steps for an iron or steelmaking application, the steps including: sampling a plurality of characteristics of PCW using a plurality of sensors; calculating one or more of Langelier Saturation Index (LSI) and Ryznar Stability Index (RSI) based on the plurality of characteristics using a LSI/RSI measurement unit coupled to the plurality of sensors; and injecting one or more anti-scalant chemicals into the PCW responsive to the calculated one or more of the LSI and the RSI using an anti-scalant injection system to thereby control scale formation in the PCW.

BRIEF DESCRIPTION OF THE DRAWINGS

The present disclosure is illustrated and described herein with reference to the various drawings, in which like reference numbers are used to denote like system components/ method steps, as appropriate, and in which.

DESCRIPTION OF ILLUSTRATIVE EMBODIMENTS

Figure 1:
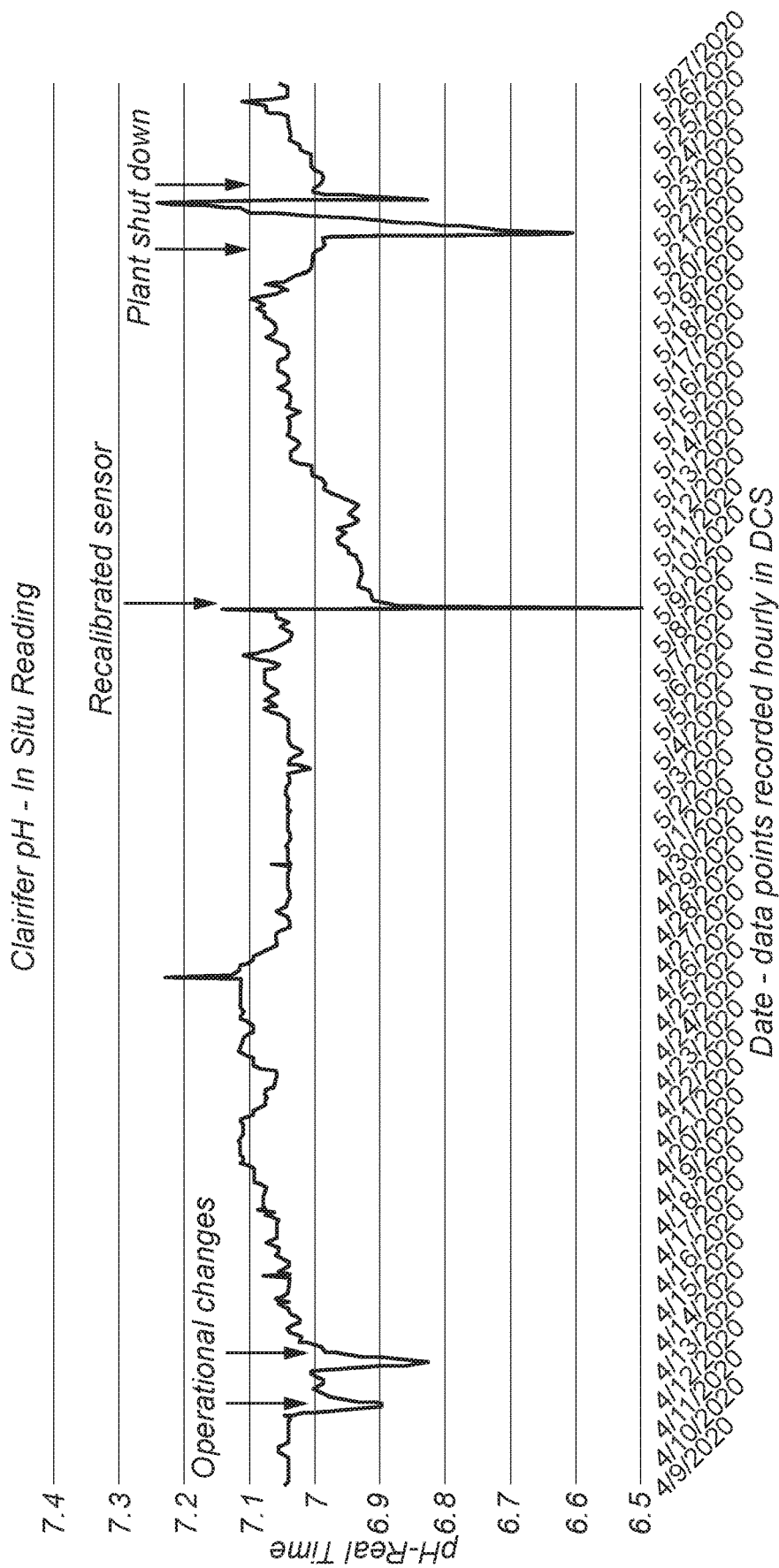
FIG. 1 is a plot illustrating example in situ clarifier pH readings over time and under different operational conditions.

In the iron and steelmaking industries, process water systems are used to cool process gas and equipment so that the manufacturing process is enhanced, and critical components are cooled effectively. Due to the heat and contaminates in the water, water treatment chemicals are used to ensure that scaling and corrosion are minimized throughout the process. Historically, the LSI and RSI have been used to determine the conditions of the water and determine the appropriate dosing of chemicals based upon the indices. However, infrequent testing, and lack of dosing adjustment based upon re-tests (if they occur), result in inaccurate anti-scalant chemical feed rates when a process changes. As a result, water treatment feeding is either overdosed (at extra expense) or under-dosed (causing increased scaling and process problems).

Specifically, in a DRI process, PCW is circulated to the following systems:
(1) Top Gas Scrubber;
(2) Cooling Gas Scrubber;
(3) Cooling Gas After Cooler;
(4) Reforming Gas Cooler; and
(5) Dust Collection Scrubber System.

These water lines have varying degrees of contaminates in the water, but the primary contaminates are iron (from the process) and calcium (from the iron ore coating and make-up water chemistry). The calcium contamination generally causes the biggest problems in the process because calcium ions ($Ca^{+2}$) combine with bicarbonate alkalinity ($HCO_3^-$) forming calcium carbonate ($CaCO_3$). The scaling potential varies based on the saturation index of calcium carbonate, and this scaling potential can be approximated by the LSI and RSI. In Blast Furnace ironmaking and BOF steelmaking, similar problems occur due to the same water chemical reactions.

In order to overcome the scaling potential of all these water systems, the industry has used these indices to approximate the scaling potential, and then utilized various anti-scalant chemistries in the water to sequester the formation of scale.

For example, chemical feed for scale control has been based on experience and/or economic conditions. However, excessive feeding can increase operating costs and too little feeding can cause scaling and production problems. Dosing is controlled by a dosing pump and pump timer, but lagging indicators, scale coupons and lab testing, are used, resulting in inconsistent performance and requiring production shutdowns to remediate scaling that occurs. When lab data is used to establish LSI/RSI rates, correct anti-scalant feed rates are generally based upon one or a limited number of data points, resulting in inconsistent chemical effectiveness because dosages are not based upon real-time data. Again, dosing is controlled by a dosing pump and pump timer, but lagging indicators, scale coupons and lab testing, are used, resulting in a lack of real-time decision making and suboptimal operating processes.

Scale formation can thus result in the following problems:
(1) Reduced production (tpy, tph);
(2) Excessive repair or pipework replacement due to scale formation;
(3) Additional annual cleaning costs to hydro jet buildup out of the pipework;
(4) Extra energy consumption to pump water through decreased diameter pipework; and
(5) Decreased product quality.

The above issues can result in millions of $USD annually in production, maintenance, and operational expense loses.

The present disclosure provides systems and methods that use LSI and RSI calculations to determine the scaling potential in the PCW and provide real-time adjustments in chemical dosing to the PCW circuit. This determination greatly reduces the scaling potential in a more comprehensive and economical manner from existing technologies. The solution incorporates reliable monitoring of the salient parameters, which are used to calculate the LSI/RSI in real time via a programmable logic controller (PLC), and utilizes a feed-forward loop through the distributed control system (DCS) to adjust chemical dosing based upon the data obtained. The ability to calculate the scaling potential greatly improves the process performance and can extend the "run time" for the plant, which typically must shut down for water related scaling and fouling issues. The present disclosure includes "building out" the needed instrumentation to measure pH, TDS, Temperature, Hardness, and Alkalinity (to calculate the LSI and RSI). This data is then integrated into a PLC algorithm that is fed into the DCS to compare current data versus setpoint LSI/RSI data. Deviations (+ or −) from the setpoint system data enable the anti-scalant pump to receive a 4/20 ma signal to adjust the feed rate for the current situation.

The advantages of this system include, but are not limited to:
(1) Chemical feed is based upon system data metrics—LSI and RSI measurements;
(2) Chemical feed is optimized, and is not necessarily consistent hour to hour, but is optimized by the LSI and RSI metrics;
(3) Chemical feed is decreased when needed or increased, thereby annual chemical spending is optimized for the process;

(4) Alarms are established and triggered if the scaling index increases greatly, which potentially can point to a problem with the lime coating on the ore, for example;
(5) Alarms also trigger system blow down when water contamination increases above established set points; and
(6) Pipework throughout the process has greatly reduced build-up of scale—
 a. Improving energy usage,
 b. Extending component life,
 c. Reducing CapEx costs (i.e., replacement), and
 d. Extending year-to-year run cycle for the plant.

Real-time results enable greater system chemical treatment response and control, thereby enhancing process performance and extending the operational months for a given plant as water related fouling and scaling are greatly diminished.

The PCW circuit is the largest water system in a direct reduced iron (DRI) process, for example, and is central to performance of the plant. Each of the below systems are cooled by this water system and productivity, quality, and energy optimization are impacted by this water system:
(1) Top Gas Scrubber;
(2) Cooling Gas Scrubber;
(3) Cooling Gas After Cooler;
(4) Reforming Gas Cooler; and
(5) Dust Collection Scrubber System.

The PCW must cool and protect each of these systems and in order to optimize effectiveness, and heat transfer must be optimized.

Efficient heat transfer is necessary for the proper function of a cooling tower or heat exchangers. Heat transfer is significantly hindered by even very thin deposits of scale. Beyond inefficiency, extreme scaling can lead to flow obstruction and eventually equipment failure. Consequently, it is critical to monitor scale forming potential in cooling water.

Scale is the generic term for the deposits that form on the interior surfaces of piping and other equipment that contacts cooling water. Settled solids and precipitated salts can both contribute to scale. The most common scales are salts of alkali earth metals, and the most common of these are calcium salts, such as calcium carbonate, $CaCO_3$. Because calcium carbonate is one of the least soluble salts, its saturation point is a useful indicator of the overall scale forming potential of the cooling water.

Precipitation is governed by several water quality parameters: pH, hardness, alkalinity, temperature, and TDS. Precipitation will not occur under conditions that favor solubility, where salt concentration is lower than the saturation point. But environments that favor precipitation are common in cooling water circuits. In addition, as cooling water is lost to evaporation and drift, the components of scale are concentrated. This concentration, known as cycling, increases the scaling potential.

Generally, the PCW system is treated with anti-scalants to minimize scale formation, but even with treatment, most plants have some scale formation. The origin of the scale is predominately from the calcium used for the iron ore coating with additional calcium coming from the level in the make-up water.

The reaction which occurs follows:

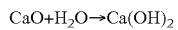

$$CaO + H_2O \rightarrow Ca(OH)_2$$

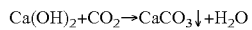

$$Ca(OH)_2 + CO_2 \rightarrow CaCO_3\downarrow + H_2O$$

Precipitation occurs when the mineral saturation index of $CaCO_3$ is greater than one (1). (Saturation Index>1 is defined when the mineral salt concentration in the water phase can no longer remain dissolved in water).

For calcium carbonate, solubility in water is inversely related to temperature, which exacerbates the scaling tendency in the PCW. This phenomenon led the water treatment industry to develop mathematical models which would aid in the determination of the scaling potential in given aqueous environments. Two of the most widely used models are LSI and RSI.

LSI addresses the concept of mineral saturation using pH as a main variable. LSI can be interpreted as the pH change required to bring water to equilibrium. Water with a LSI of 1.0 is one pH unit above saturation. Reducing the pH by 1 unit will bring the water into equilibrium. This occurs because the portion of total alkalinity present as $CO_3^{-2}$ decreases as the pH decreases, according to the equilibria describing the dissociation of carbonic acid:

$$H_2CO_3 \leftrightarrows HCO_3^- + H^+$$

$$HCO_3^- \leftrightarrows CO_3^{-2} + H^+$$

The formula for LSI is given by:

$$LSI = pH - pH_s$$

where:
pH is the measured water pH; and
$pH_s$ is the pH at saturation in calcite or calcium carbonate and is defined as:

$$pH_s = (9.3 + A + B) - (C + D)$$

where:
$A = (Log_{10}[TDS] - 1)/10$;
$B = -13.12 \times Log_{10}(°C. + 273) + 34.55$;
$C = Log_{10}[Ca^{2+} \text{ as } CaCO_3] - 0.4$; and
$D = Log_{10}[\text{alkalinity as } CaCO_3]$.

The solubility of calcium carbonate decreases as pH increases. When the actual pH is greater than the pH at which calcium carbonate is saturated, precipitation and scaling will be favored. This is indicated by a positive LSI (>0), or an RSI<6. When the actual pH is less than the pH at which calcium carbonate is saturated, solubility, and corrosion, will be favored. This is indicated by a negative LSI, or an RSI>6. An LSI of 0, or RSI of 6, indicates equilibrium. Neither index quantifies the amount of scale present. They only serve as indicators of the potential for scale or corrosion:
 If LSI is negative: No potential to scale, the water will dissolve $CaCO_3$;
 If LSI is positive: Scale can form and $CaCO_3$ precipitation may occur; and
 If LSI is close to zero: Borderline scale potential, water quality or changes in temperature, or evaporation, could change the index.

RSI attempts to correlate scale thickness observed to the water chemistry. Like the LSI, the RSI has its basis in the concept of saturation level. RSI is given by:

$$RSI = 2(pH_s) - pH$$

where:
pH is the measured water pH; and
$pH_s$ is the pH at saturation in calcite or calcium carbonate.
The correlation of RSI can be summarized as follows:
 RSI<<6, the scale tendency increases as the index decreases;
 RSI>>7, the calcium carbonate formation probably does not lead to a protective corrosion inhibitor film; and RSI>>8, mild steel corrosion becomes an increasing problem.

These indices are very important models used for the process water systems of a DRI-PCW system, as well as Blast Furnace and Steelmaking water systems, because they all have a general tendency to become scale forming under the operating conditions.

Using the LSI and RSI calculations above and typical water chemistry parameters for a PCW system (below) the water can be shown to be mildly scale forming:
pH=8.3;
Ca Hardness=300;
Alkalinity=200;
Temperature=36;
TDS=1400;
LSI=1.5; and
RSI=5.3

The LSI and RSI models are used extensively, as mentioned, throughout the industry, but scale control technology within the DRI, Iron, and Steelmaking industries have only indirectly used these models to aid in scale control of the process. There is no real-time monitoring or controlling of these water systems to add the required level of treatment. The best technology available can only run off-line laboratory LSI/RSI tests, but rarely are adjustments made even if the tests are run.

Again, for example, chemical feed for scale control has been based on experience and/or economic conditions. However, excessive feeding can increase operating costs and too little feeding can cause scaling and production problems. Dosing is controlled by a dosing pump and pump timer, but lagging indicators, scale coupons and lab testing, are used, resulting in inconsistent performance and requiring production shutdowns to remediate scaling that occurs. When lab data is used to establish LSI/RSI rates, correct anti-scalant feed rates are generally based upon one or a limited number of data points, resulting in inconsistent chemical effectiveness because dosages are not based upon real-time data. Again, dosing is controlled by a dosing pump and pump timer, but lagging indicators, scale coupons and lab testing, are used, resulting in a lack of real-time decision making and sub-optimal operating processes. Thus, conventional methods have typically been limited to laboratory testing and oftentimes identified laboratory scale potential increases do not result in increased anti-scalant feed rates at the plant. Conversely, if scaling potential decreases, chemical feed rates are not reduced. Because of these monitoring and control limitations, a solution is needed that utilizes improved instrumentation design to build out equipment that provides the needed measurements to make necessary calculations to establish pump feed rates based on scaling potential. This system is outlined in the present disclosure.

Practically, this system of the present disclosure incorporates existing technologies, in a new control scheme that has never been successfully deployed in the past—because, the reliability of components has not existed until very recently. Functionally, this idea is new, because control of anti-scalant feed has never been automated based upon real-time LSI/RSI measurements in DRI, Blast Furnace, and/or Steelmaking process water systems. Combining all the needed components into a deployed process control scheme enables the PCW process to be protected from scaling and operational limitations.

Figure 2:
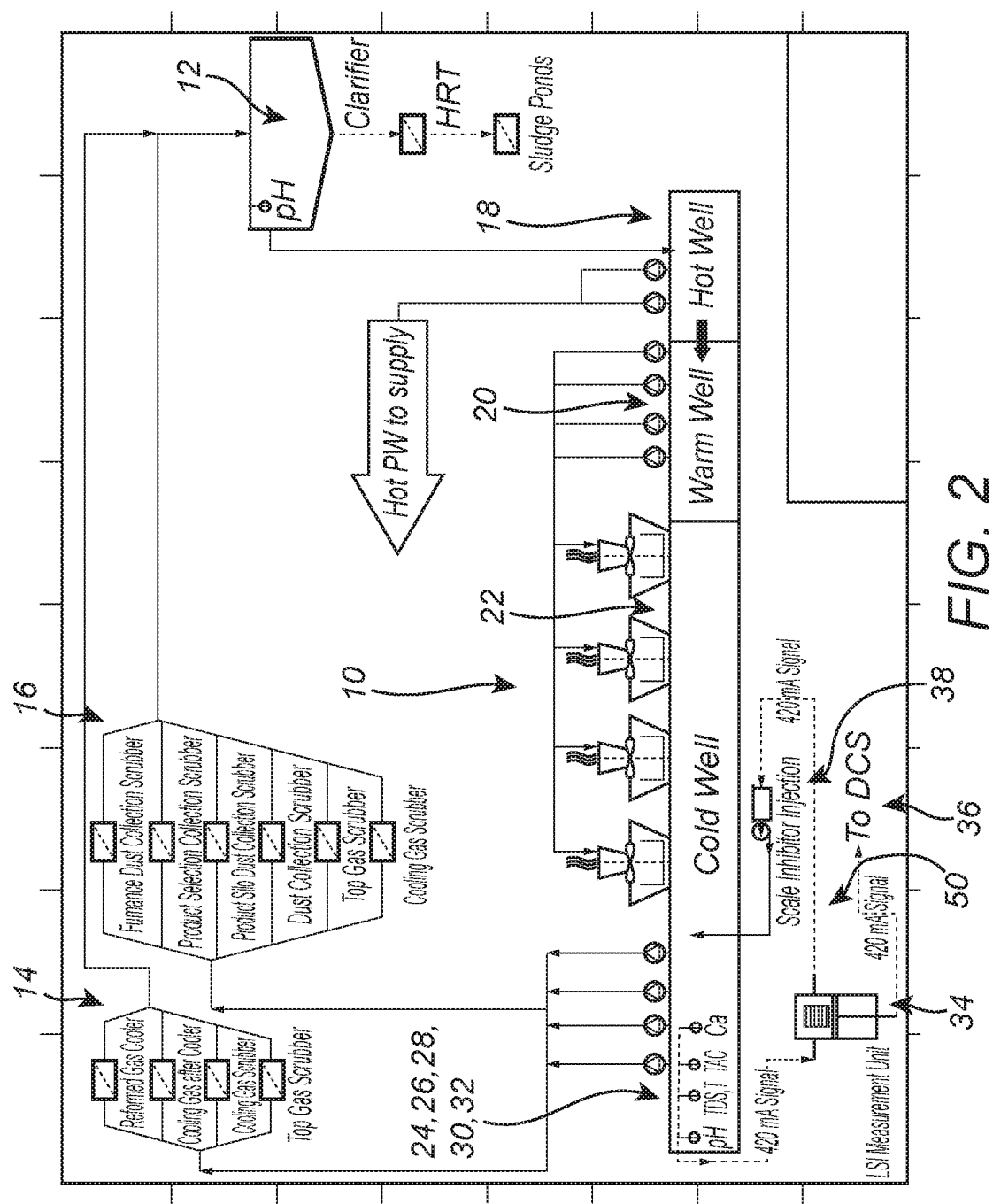
FIG. 2 is a schematic diagram of one illustrative embodiment of the PCW system of the present disclosure.
Figure 3:
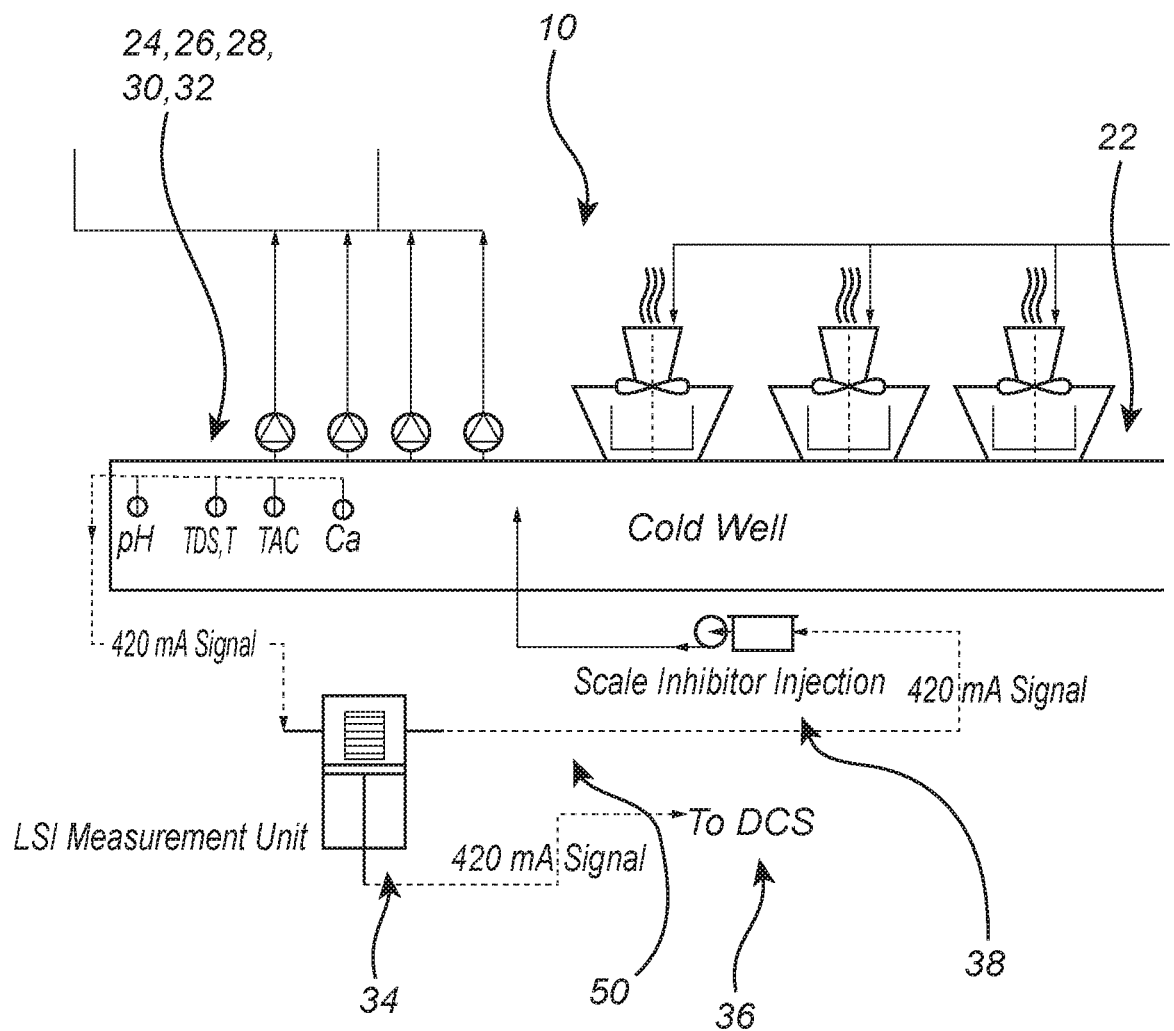
FIG. 3 is a schematic diagram of one illustrative embodiment of the LSI/RSI-based anti-scalant dosing feedback control loop of the PCW system of the present disclosure.

FIG. 2 is a schematic diagram of one illustrative embodiment of the PCW system of the present disclosure and FIG. 3 is a schematic diagram of one illustrative embodiment of the LSI/RSI-based anti-scalant dosing feedback control loop of the PCW system of the present disclosure. Referring now specifically to these figures, the PCW system 10 generally is generally coupled to a clarifier 12 that receives process water from a reformed gas cooler, a cooling gas after-cooler, a cooling gas scrubber, and top gas scrubber, and/or the like 14, as well as a furnace dust collection scrubber, a product selection dust collection scrubber, a product silo dust collection scrubber, a dust collection scrubber, a top gas scrubber, a cooling gas scrubber, and/or the like 16, and delivers the process water to one or more of a hot well 18, a warm well 20, and a cold well 22 of the clarifier 12 of the PCW system 10. Additional components might be included in some plants or in future plants, but the general idea is that process water from a DRI plant, a Blast Furnace process, or a Steelmaking plant with saturation index levels>>1 due to calcium scaling can be effectively controlled.

Generally, a pH sensor 24, a TDS sensor 26, a temperature sensor 28, a calcium hardness sensor 30, and a total alkalinity titer (TAC) sensor 32 are in communication with the cold well 22 of the PCW system 10. The pH sensor 24 includes a solid state analyzer for monitoring the pH of the industrial water. The TDS sensor 26 indirectly monitors by conductance, utilizing conductivity probes with 2 or 4 electrodes that enable the building of a conductivity analyzer loop providing easy measurement and signal relay to the PLC. The factor for TDS is 0.7*Conductance in µS/cm. The temperature sensor 28 in includes a thermometer. The calcium hardness sensor 30 and the TAC sensor 32 use titration as the detection method and are capable of operation in a wide range of water qualities—analog and digital output options are available so that readings may be integrated into the LSI/RSI calculation(s). All of these devices are well known to those of ordinary skill in the art, but have not been used in the present application before.

The various sensors are all coupled to a LSI/RSI measurement unit 34 and/or the DCS 36 of the PCW system 10, the latter of which controls all higher functions of the PCW system 10. The LSI/RSI measurement unit 34 calculates the LSI/RSI using the sensor data based on one of the following calculations:

$$LSI = pH - pH_s$$

where:
pH is the measured water pH; and
$pH_s$ is the pH at saturation in calcite or calcium carbonate and is defined as:

$$pH_s = (9.3 + A + B) - (C + D)$$

where:
$A = (\mathrm{Log}_{10}[TDS] - 1)/10$;
$B = -13.12 \times \mathrm{Log}_{10}(°C. + 273) + 34.55$;
$C = \mathrm{Log}_{10}[Ca^{2+} \text{ as } CaCO_3] - 0.4$; and
$D = \mathrm{Log}_{10}[\text{alkalinity as } CaCO_3]$.

$$RSI = 2(pH_s) - pH$$

where:
pH is the measured water pH; and
$pH_s$ is the pH at saturation in calcite or calcium carbonate. This provides an LSI/RSI feedback loop 50 for anti-scalant injection.

Figure 4:
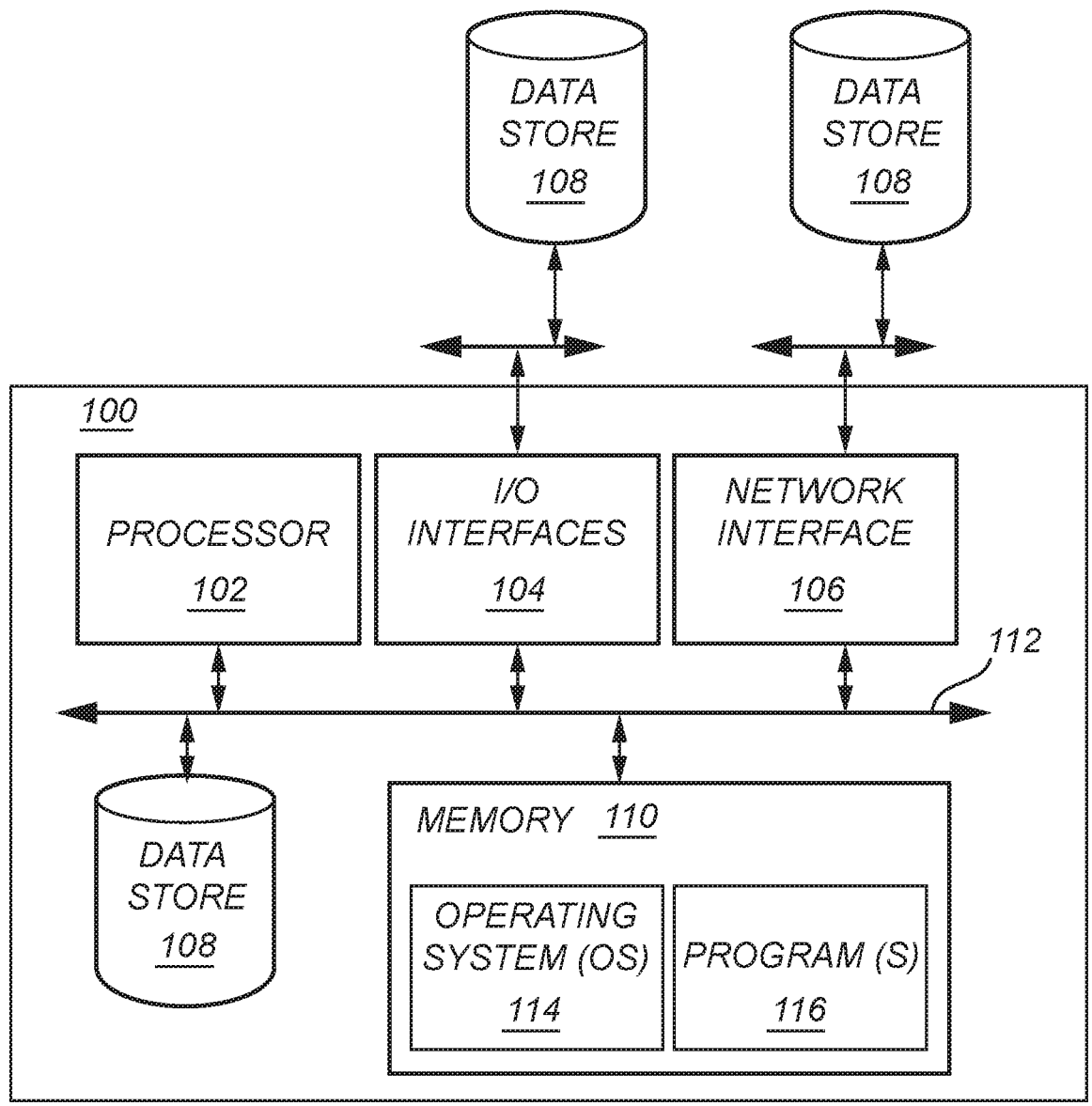
FIG. 4 is a block diagram of a computer server which may be used in the PCW system of the present disclosure.

Referring now specifically to FIG. 4, the LSI/RSI measurement unit 34 (FIGS. 2 and 3) and/or the DCS 36 (FIGS. 2 and 3) consist of one or more computers or servers 100, which may be used stand-alone or in a networked or cloud-based system. In terms of hardware architecture, the computer or server 100 generally includes a processor 102, input/output (I/O) interfaces 104, a network interface 106, a data store 108, and memory 110 storing a non-transitory computer-readable medium including executable instructions. It should be appreciated by those of ordinary skill in the art that FIG. 4 depicts the computer/server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but is not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the computer/server 100, a semiconductor-based microprocessor (in the form of a microchip or chipset), or generally any device for executing software instructions. When the computer/server 100 is in operation, the processor 102 is configured to execute software stored within the memory 110, to communicate data to and from the memory 110, and to generally control operations of the computer/server 100 pursuant to the software instructions. The I/O interfaces 104 may be used to receive user input from and/or for providing system output to one or more devices or components.

The network interface 106 may be used to enable the computer/server 100 to communicate on a network, such as the Internet. The network interface 106 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the computer/server 100, such as, for example, an internal hard drive connected to the local interface 112 in the computer/server 100. Additionally, in another embodiment, the data store 108 may be located external to the computer/server 100, such as, for example, an external hard drive connected to the I/O interfaces 104 (e.g., a SCSI or USB connection). In a further embodiment, the data store 108 may be connected to the computer/server 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some embodiments illustrated herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various illustrative embodiments.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Referring again specifically to FIGS. 2 and 3, the DCS 36 directs the injection of anti-scalant into the cold well 22 of the PCW system 10 (or otherwise) based on the LSI/RSI calculation. Thus, the scale inhibitor injection system 38 includes an appropriate dosing pump and conduit, as is well known to those of ordinary skill in the art. Scale inhibitors are specialty chemicals that are added to water to delay, reduce and/or prevent scale deposition. Compounds based on acrylic acid polymers, maleic acid polymers and phosphonates have been used extensively for scale treatment in water systems due to their excellent solubility, thermal stability and dosage efficiency. In the water treatment industry, the major classes of scale inhibitors are inorganic phosphate, organo phosphorous, and organic polymer backbones. The below lists many candidates that may be used per the present disclosure:

PBTC (phosphonobutane-1,2,4-tricarboxylic acid),
ATMP (amino-trimethylene phosphonic acid),
HEDP (1-hydroxyethylidene-1,1-diphosphonic acid),
PAA (polyacrylic acid),
PAAS (polyacrylic acid sodium salt),
HPMA (Hydrolyzed Polymaleic Anhydride),
AA AMPS Copolymer (copolymer of acrylic acid and 2-acrylamide-2-methylpropane sulfonic acid),
AA/HPA (Acrylic Acid-hydroxypropyl Acrylate Copolymer—Acrylic Acid/Acrylate/Sulfosalt Terpolymer),
PCA (Phosphino carboxylic acid),
PPCA (phosphinopolyacrylates),
PMA (polymaleic acids),
MAT (maleic acid terpolymers),
SPOCA (sulfonic acid copolymers-sulfonated phosphonocarboxylic acid, and polyvinyl sulfonates),
DTPMP (Diethylenetriamine-penta (methylene phosphonic acid)),
MA-AA (acrylic acid maleic acid copolymer),
PSO (phosphor succinic oligomer),
PAPEMP (Polyamino Polyether Methylene Phosphonate),
HPAA (2-Hydroxy Phosphonoacetic Acid),
HDTMP (Hexamethylenediamine Tetra-methylene Phosphonic Acid), and/or
BHMTPMPA (Bis(hexamethylene) Triamine Penta (methylene-phosphonic Acid)).

Figure 5:
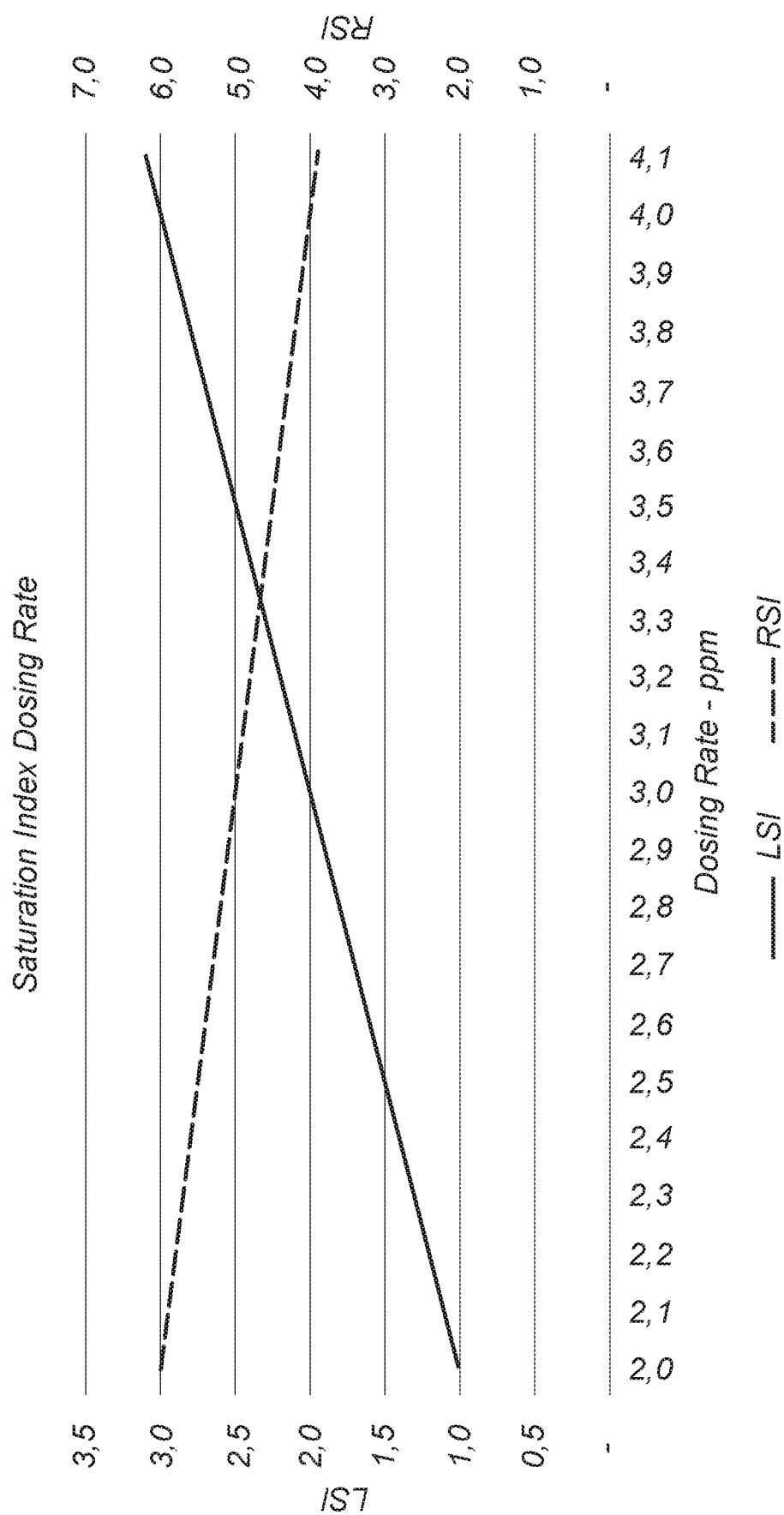
FIG. 5 is a plot illustrating an example anti-scalant dosing scheme for various LSI/RSI calculations using the PCW system of the present disclosure.

Thus, the PCW system 10 includes a pH sensor which has demonstrated reliable readings in the environment of the present application, conductivity instrumentation which determines the TDS in the system, a temperature sensor, a calcium analyzer, an alkalinity analyzer, an LSI/RSI PLC controller to calculate LSI/RSI and 4/20 mA signal outputs to the DCS, dosing pump equipment with 4/20 mA signal inputs to adjust feed based upon the DCS signal, and chemical selection based upon baseline water analysis to ensure that scale formation is effectively sequestered. Each of the sensors is deployed in the cold well of the clarifier (or in-line after a heat exchanger) and sends its signals to the PLC controller to calculate the LSI/RSI and determine the proper chemical dose using a site-specific algorithm. The dosing algorithm is established at each site because of make-up water chemistry variation and anti-scalant product selection, but, essentially, the algorithm uses a model similar to the graph of FIG. 5. Anti-scalant selection chemistry is varied and has degrees of effectiveness in any given water system. Therefore, once the water is analyzed and anti-scalant selection is determined, the graph can be modified slightly and incorporated into the local algorithm. Based on the local model and the resultant calculation, the PLC will send the dosing algorithm to the DCS from which the DCS can make needed adjustments to the chemical feed pump. The dosing need of anti-scalant can be automatically adjusted from a set point level (up or down) with a signal from the DCS to the chemical feed pump.

Preferably, the pH sensor of the present disclosure is made of materials that are customized to the environment that they are to be used in, and are designed to chemically withstand the environment and exhibit wear resistance caused by aggressive gasses and abrasion from high-velocity solids. The electronic transmission function uses latest technology. Solid state construction is completely sealed and customized to the environment. No internal O-rings are used as these degrade and are prone to failure. No gels or electrolytes are used as these can easily contaminate and increase maintenance. A large surface area is used that reduces fouling and improves reliability. Glass characteristics result in very low drift and reliable readings over prolonged periods—2-4 weeks. Glass construction is highly durable, and double and triple-junction construction provides long life.

The present disclosure provides systems and methods that use LSI and RSI calculations to determine the scaling potential in the PCW and provide real-time adjustments in chemical dosing to the PCW circuit. This determination greatly reduces the scaling potential in a more comprehensive and economical manner from existing technologies. The solution incorporates reliable monitoring of the salient parameters, which are used to calculate the LSI/RSI in real time, and utilizes a feed-forward loop through the DCS to adjust chemical dosing based upon the data obtained. The ability to calculate the scaling potential greatly improves the process performance and can extend the "run time" for the plant, which typically must shut down for water related scaling and fouling issues. The present disclosure includes "building out" the needed instrumentation to measure pH, TDS, Temperature, Hardness, and Alkalinity (to calculate the LSI and RSI). This data is then integrated into a PLC algorithm that is fed into the DCS to compare current data versus setpoint LSI/RSI data. Deviations (+ or −) from the setpoint system data enable the anti-scalant pump to receive a 4/20 ma signal to adjust the feed rate for the current situation.

The advantages of this system include, but are not limited to:

(1) Chemical feed is based upon system data metrics—LSI and RSI measurements;
(2) Chemical feed is optimized, and is not necessarily consistent hour to hour, but is optimized by the LSI and RSI metrics;
(3) Chemical feed is decreased when needed or increased, thereby annual chemical spending is optimized for the process;
(4) Alarms are established and triggered if the scaling index increases greatly, which potentially can point to a problem with the lime coating on the ore, for example;
(5) Alarms also trigger system blow down when water contamination increases above established set points; and
(6) Pipework throughout the process has greatly reduced build-up of scale—
  a. Improving energy usage,
  b. Extending component life,
  c. Reducing CapEx costs (i.e., replacement), and
  d. Extending year-to-year run cycle for the plant.

Real-time results enable greater system chemical treatment response and control, thereby enhancing process performance and extending the operational months for a given plant as water related fouling and scaling are greatly diminished.

Although the present disclosure is illustrated and described herein with reference to illustrative embodiments and specific examples thereof, it will be readily apparent to those of ordinary skill in the art that other illustrative embodiments and examples may perform similar functions and/or achieve like results. All such equivalent illustrative embodiments and examples are within the spirit and scope of the present disclosure, are contemplated thereby, and are intended to be covered by the following non-limiting claims for all purposes.

What is claimed is:

1. A process cooling water (PCW) system for an iron or steelmaking application, the PCW system comprising:
    a plurality of sensors configured to sample a plurality of characteristics of the PCW system;
    a Langelier Saturation Index (LSI)/Ryznar Stability Index (RSI) measurement unit coupled to the plurality of sensors, the LSI/RSI measurement unit configured to calculate one or more of LSI and RSI based on the plurality of characteristics of the PCW system; and
    a scale inhibitor injection system having a scale inhibitor dosing pump, the scale inhibitor injection system configured to inject one or more scale inhibitors into the PCW system, the scale inhibitor injection system including a distributed control system (DCS) in communication with the LSI/RSI measurement unit and the scale inhibitor dosing pump, the DCS configured to adjust a dosing algorithm for dosing the one or more scale inhibitors in real time responsive to the calculated one or more of the LSI and the RSI to thereby control scale formation in the PCW system,
    wherein the one or more scale inhibitors is at least one inhibitor selected from the group consisting of phosphonobutane-1,2,4-tricarboxylic acid (PBTC), amino-trimethylene phosphonic acid (ATMP), 1-hydroxyethylidene-1,1-diphosphonic acid (HEDP), phosphino carboxylic acid (PCA), phosphinopolyacrylates (PPCA), sulfonic acid copolymers-sulfonated phosphonocarboxylic acid, diethylenetriamine-penta (methylene phosphonic acid) (DTPMP), phosphor succinic oligomer (PSO), polyamino polyether methylene phosphonate (PAPEMP), 2-hydroxy phosphonoacetic acid (HPAA), hexamethylenediamine tetra-methylene phosphonic acid (HDTMP), bis(hexamethylene) triamine penta (methylene-phosphonic acid) (BHMTPMPA), polyacrylic acid sodium salt (PAAS), hydrolyzed polymaleic anhydride (HPMA), copolymer of acrylic acid and 2-acrylamide-2-methylpropane sulfonic acid (AA/AMPS), acrylic acid-hydroxypropyl acrylate copolymer-acrylic acid/acrylate/sulfosalt terpolymer (AA/HPA), polymaleic acids (PMA), maleic acid terpolymers (MAT), polyvinyl sulfonates, and acrylic acid maleic acid copolymer (MA/AA).

2. The PCW system of claim 1, wherein the plurality of sensors comprise one or more of:
    a pH sensor configured to measure a pH characteristic of the PCW system;
    a total dissolved solids (TDS) sensor configured to measure a TDS characteristic of the PCW system;
    a temperature sensor configured to measure a temperature characteristic of the PCW system;
    a calcium hardness sensor configured to measure a calcium hardness characteristic of the PCW system; and
    an alkalinity (TAC) sensor configured to measure an alkalinity characteristic of the PCW system.

3. The PCW system of claim 1, wherein the DCS is configured to control the scale inhibitor dosing pump for injecting the one or more scale inhibitors into the PCW system responsive to the calculated one or more of the LSI and the RSI in real time.

4. The PCW system of claim 1, wherein the plurality of sensors are disposed within a clarifier of the PCW system.

5. The PCW system of claim 4, wherein the plurality of sensors are disposed within a cold well of the clarifier of the PCW system.

6. The PCW system of claim 1, wherein the plurality of sensors are in-line downstream of a heat exchanger of the PCW system.

7. The PCW system of claim 1, wherein the scale inhibitor injection system is fluidly coupled to a cold well of a clarifier of the PCW system.

8. A process cooling water (PCW) method for an iron or steelmaking application, the PCW method comprising:
    sampling a plurality of characteristics of a PCW system using a plurality of sensors;
    calculating one or more of Langelier Saturation Index (LSI) and Ryznar Stability Index (RSI) based on the plurality of characteristics using a LSI/RSI measurement unit coupled to the plurality of sensors; and
    injecting one or more scale inhibitors into the PCW system; and
    adjusting a dosing algorithm for dosing the one or more scale inhibitors in real time responsive to the calculated one or more of the LSI and the RSI to thereby control scale formation in the PCW system,
    wherein the one or more scale inhibitors is at least one inhibitor selected from the group consisting of phosphonobutane-1,2,4-tricarboxylic acid (PBTC), amino-trimethylene phosphonic acid (ATMP), 1-hydroxyethylidene-1,1-diphosphonic acid (HEDP), phosphino carboxylic acid (PCA), phosphinopolyacrylates (PPCA), sulfonic acid copolymers-sulfonated phosphonocarboxylic acid, diethylenetriamine-penta (methylene phosphonic acid) (DTPMP), phosphor succinic oligomer (PSO), polyamino polyether methylene phosphonate (PAPEMP), 2-hydroxy phosphonoacetic acid (HPAA), hexamethylenediamine tetra-methylene phosphonic acid (HDTMP), bis(hexamethylene) triamine penta (methylene-phosphonic acid) (BHMTPMPA), polyacrylic acid sodium salt (PAAS), hydrolyzed polymaleic anhydride (HPMA), copolymer of acrylic acid and 2-acrylamide-2-methylpropane sulfonic acid (AA/AMPS), acrylic acid-hydroxypropyl acrylate copolymer-acrylic acid/acrylate/sulfosalt terpolymer (AA/HPA), polymaleic acids (PMA), maleic acid terpolymers (MAT), polyvinyl sulfonates, and acrylic acid maleic acid copolymer (MA/AA).

9. The PCW method of claim 8, wherein the plurality of sensors comprise one or more of:
    a pH sensor configured to measure a pH characteristic of the PCW system;
    a total dissolved solids (TDS) sensor configured to measure a TDS characteristic of the PCW system;
    a temperature sensor configured to measure a temperature characteristic of the PCW system;
    a calcium hardness sensor configured to measure a calcium hardness characteristic of the PCW system; and an alkalinity (TAC) sensor configured to measure an alkalinity characteristic of the PCW system.

10. The PCW method of claim 8, wherein the plurality of sensors are disposed within a clarifier of the PCW system.

11. The PCW method of claim 10, wherein the plurality of sensors are disposed within a cold well of the clarifier of the PCW system.

12. The PCW method of claim 8, wherein the plurality of sensors are in-line downstream of a heat exchanger of the PCW system.

13. The PCW method of claim 8, wherein the scale inhibitor injection system is fluidly coupled to a cold well of a clarifier of the PCW system.

14. The PCW system of claim 1, wherein the DCS adjusts the dosing algorithm based on make-up water chemistry in the PCW system determined by at least one of the plurality of sensors.

15. The PCW system of claim 1, wherein the one or more scale inhibitors include at least one inhibitor selected from the group consisting of phosphonobutane-1,2,4-tricarboxylic acid (PBTC), amino-trimethylene phosphonic acid (ATMP), 1-hydroxyethylidene-1,1-diphosphonic acid (HEDP), phosphino carboxylic acid (PCA), phosphinopolyacrylates (PPCA), sulfonic acid copolymers-sulfonated phosphonocarboxylic acid, diethylenetriamine-penta (methylene phosphonic acid) (DTPMP), phosphor succinic oligomer (PSO), polyamino polyether methylene phosphonate (PAPEMP), 2-hydroxy phosphonoacetic acid (HPAA), hexamethylenediamine tetra-methylene phosphonic acid (HDTMP), and bis(hexamethylene) triamine penta (methylene-phosphonic acid) (BHMTPMPA).

16. The PCW system of claim 1, wherein the one or more scale inhibitors include at least one inhibitor selected from the group consisting of polyacrylic acid sodium salt (PAAS), hydrolyzed polymaleic anhydride (HPMA), copolymer of acrylic acid and 2-acrylamide-2-methylpropane sulfonic acid (AA/AMPS), acrylic acid-hydroxypropyl acrylate copolymer-acrylic acid/acrylate/sulfosalt terpolymer (AA/HPA), polymaleic acids (PMA), maleic acid terpolymers (MAT), polyvinyl sulfonates, and acrylic acid maleic acid copolymer (MA/AA).

17. The PCW system of claim 1, wherein the one or more scale inhibitors include at least one inhibitor selected from the group consisting of 1-hydroxyethylidene-1,1-diphosphonic acid (HEDP), phosphonobutane-1,2,4-tricarboxylic acid (PBTC), polyamino polyether methylene phosphonate (PAPEMP), amino-trimethylene phosphonic acid (ATMP), diethylenetriamine-penta (methylene phosphonic acid) (DTPMP), hydrolyzed polymaleic anhydride (HPMA), copolymer of acrylic acid and 2-acrylamide-2-methylpropane sulfonic acid (AA/AMPS), and phosphino carboxylic acid (PCA).

18. The PCW system of claim 1, wherein the one or more scale inhibitors include at least one inhibitor selected from the group consisting of polymaleic acids (PMA), maleic acid terpolymers (MAT), and acrylic acid maleic acid copolymer (MA/AA).

19. The PCW system of claim 18, wherein the one or more scale inhibitors includes at least one of the PMA.

20. The PCW system of claim 1, wherein the plurality of sensors are arranged to sample a plurality of characteristics of water at a water source site in the PCW system, the scale inhibitor dosing pump is in fluid communication with the water source site, and the scale inhibitor injection system is configured to inject the one or more scale inhibitors into the water at the water source site.

21. The PCW system of claim 20, wherein the DCS is configured to establish a site-specific dosing algorithm at the water source site based on the LSI/RSI calculated from the plurality of characteristics of the water at the water source site to control dosing of the one or more scale inhibitors.

22. The PCW system of claim 1, wherein the plurality of sensors are disposed within a clarifier of the PCW system, the scale inhibitor dosing pump is in fluid communication with the clarifier, and the scale inhibitor injection system is configured to inject the one or more scale inhibitors into the clarifier.

* * * * *